United States Patent
Fix et al.

(10) Patent No.: US 11,662,812 B2
(45) Date of Patent: *May 30, 2023

(54) SYSTEMS AND METHODS FOR USING A DISPLAY AS AN ILLUMINATION SOURCE FOR EYE TRACKING

(71) Applicant: META PLATFORMS TECHNOLOGIES, LLC, Menlo Park, CA (US)

(72) Inventors: Alexander Jobe Fix, Seattle, WA (US); Andrew Wyman MacDonald, Seattle, WA (US); Dmitri Model, Fremont, CA (US); Mohammadhossein Daraeihajitooel, Seattle, WA (US); Javier San Agustin Lopez, Deba (ES); Kirk Erik Burgess, Newark, CA (US); Mohamed Hegazy, Sammamish, WA (US); Scott Robert Ramsby, Kirkland, WA (US); Sebastian Sztuk, Menlo Park, CA (US); Robert Dale Cavin, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/464,637

(22) Filed: Sep. 1, 2021

(65) Prior Publication Data
US 2021/0397255 A1    Dec. 23, 2021

Related U.S. Application Data

(63) Continuation of application No. 16/274,272, filed on Feb. 13, 2019, now Pat. No. 11,112,865.

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G02B 27/0172* (2013.01);
(Continued)

(58) Field of Classification Search
CPC ..... G06F 3/013; G06F 3/017; G02B 27/0093; G02B 27/0172; G02B 2027/0138; H04N 5/33
See application file for complete search history.

(56) References Cited

U.S. PATENT DOCUMENTS 5,309,185 A * 5/1994 Harper ................... A61B 3/036
                                                        351/215
5,500,671 A * 3/1996 Andersson ............. H04N 7/144
                                                        348/E7.083

(Continued)

OTHER PUBLICATIONS

Final Office Action received for U.S. Appl. No. 16/274,272 dated May 10, 2021, 40 pages.

(Continued)

*Primary Examiner* — Nicholas Augustine
(74) *Attorney, Agent, or Firm* — Greenberg Traurig, LLP (57) ABSTRACT

The disclosed eye-tracking systems may include a visible light display having visible light pixels, at least one infrared pixel positioned within bounds of the visible light display, and an infrared sensor positioned and configured to detect infrared light originating from the at least one infrared pixel and reflected from an eye of the user. Related head-mounted display systems and methods for eye tracking are also disclosed.

20 Claims, 9 Drawing Sheets

(51) Int. Cl.
*H04N 5/33* (2023.01)
*G02B 27/01* (2006.01)
*G06F 3/00* (2006.01)

(52) U.S. Cl.
CPC ............... *G06F 3/017* (2013.01); *H04N 5/33* (2013.01); *G02B 2027/0138* (2013.01)

(56) References Cited

U.S. PATENT DOCUMENTS

| | | | | |
|---|---|---|---|---|
| 5,550,602 | A * | 8/1996 | Braeuning | H04N 13/339 351/239 |
| 5,933,210 | A * | 8/1999 | Ron | A61B 3/063 351/243 |
| 7,245,273 | B2 * | 7/2007 | Eberl | G02B 27/0172 345/7 |
| 7,267,439 | B2 * | 9/2007 | Toshima | A61B 3/036 351/239 |
| 7,309,128 | B2 * | 12/2007 | Cappo | A61B 3/024 351/224 |
| 8,942,419 | B1 * | 1/2015 | Wu | H04N 5/225 382/103 |
| 9,674,436 | B2 * | 6/2017 | Crane | G06F 3/013 |
| 10,841,504 | B1 * | 11/2020 | Talbert | H04N 13/204 |
| 10,963,103 | B1 * | 3/2021 | Shahmohammadi | G02B 27/14 |
| 11,112,865 | B1 | 9/2021 | Fix et al. | |
| 2002/0101568 | A1 * | 8/2002 | Eberl | G02B 27/0172 351/211 |
| 2003/0067537 | A1 * | 4/2003 | Myers | H04N 13/246 348/E13.016 |
| 2004/0057013 | A1 * | 3/2004 | Cappo | A61B 3/024 351/224 |
| 2005/0175218 | A1 * | 8/2005 | Vertegaal | G06V 40/20 345/157 |
| 2005/0206583 | A1 * | 9/2005 | Lemelson | A61B 3/113 345/7 |
| 2006/0028400 | A1 * | 2/2006 | Lapstun | G02B 27/0093 345/8 |
| 2006/0110008 | A1 * | 5/2006 | Vertegaal | G06T 7/251 382/103 |
| 2007/0060390 | A1 * | 3/2007 | Wells | G07F 17/32 463/46 |
| 2013/0176533 | A1 | 7/2013 | Raffle et al. | |
| 2013/0215235 | A1 * | 8/2013 | Russell | H04N 13/271 348/47 |
| 2013/0335546 | A1 * | 12/2013 | Crane | G02B 27/017 348/E5.04 |
| 2015/0063635 | A1 * | 3/2015 | Williams | G06V 40/193 382/103 |
| 2015/0169953 | A1 | 6/2015 | Border et al. | |
| 2015/0196199 | A1 * | 7/2015 | Toda | A61B 3/1216 351/221 |
| 2016/0033822 | A1 | 2/2016 | Jiang et al. | |
| 2016/0132752 | A1 * | 5/2016 | Qvarfordt | G06V 40/197 382/103 |
| 2019/0025590 | A1 * | 1/2019 | Haddick | G02B 27/141 |
| 2019/0191977 | A1 * | 6/2019 | Talbert | H04N 5/2256 |

OTHER PUBLICATIONS

Non-Final office Action received for U.S. Appl. No. 16/274,272, dated Apr. 6, 2020, 46 pages.
Non-Final Office Action received for U.S. Appl. No. 16/274,272 dated Jan. 12, 2021, 36 pages.
Notice of Allowance received for U.S. Appl. No. 16/274,272 dated Jul. 13, 2021, 37 pages.

* cited by examiner

SYSTEMS AND METHODS FOR USING A DISPLAY AS AN ILLUMINATION SOURCE FOR EYE TRACKING

CROSS-REFERENCE TO RELATED APPLICATION

This application is a continuation of U.S. application Ser. No. 16/274,272, filed 13 Feb. 2019, the disclosure of which is incorporated, in its entirety, by this reference.

BACKGROUND

Artificial reality systems include systems for virtual reality, augmented reality, mixed reality, or hybrid reality. Conventional artificial reality systems present images to a user to overlay or replace the user's view of a real-world environment. To this end, some artificial reality systems include a display that is mounted on a user's head and in front of the user's eyes. In such head-mounted displays ("HMDs"), a position of the user's eyes may be tracked to improve the focus of the displayed image, to determine or predict where or at what object (virtual or real) the user is looking, or for other purposes.

Eye tracking may be accomplished by directing an infrared ("IR") source (e.g., glints) at the user's eye and using an IR camera to detect patterns of the IR light reflecting from the eye. In conventional AR glasses, the IR sources and IR cameras are typically mounted around the periphery of the frame of the glasses. Unfortunately, eyelids and eyelashes may block the IR light from the IR source or the reflection of the IR light from the eye to the IR camera. In addition, the IR light may not reach the eye or the IR camera when the user looks in different directions and/or the position of the eye or eyelid shifts.

Accordingly, the present disclosure recognizes a need and solution for improving eye-tracking systems.

SUMMARY

As will be described in greater detail below, the instant disclosure describes systems and methods for eye tracking that may include at least one IR pixel positioned within a visible light display. Such systems and methods may facilitate and improve eye tracking by providing IR sources in areas where a user will be looking when viewing an image provided by the visible light display.

In some embodiments, the present disclosure includes eye-tracking systems that may include a visible light display, at least one infrared pixel positioned within bounds of the visible light display, and an infrared sensor. The visible light display may be configured to display images to an eye of a user via a plurality of visible light pixels. The at least one infrared pixel may be positioned between the visible light pixels and may be configured to direct infrared light to the eye of the user. The infrared sensor may be positioned and configured to detect infrared light originating from the at least one infrared pixel and reflected from the eye of the user.

In some examples, the at least one infrared pixel may include a plurality of infrared pixels arranged in the visible light display in a predetermined pattern, such as a plurality of individual points across the visible light display to produce a corresponding plurality of infrared glints directed at the eye of the user. Additionally or alternatively, the predetermined pattern may include a grid of infrared pixels across the visible light display. The at least one infrared pixel may emit infrared light from at least one of: a vertical-cavity surface-emitting laser ("VCSEL"), an infrared light emitting diode ("IR LED"), or a quantum dot. Each of the visible light pixels may be an RGB light source. The visible light display may, in some embodiments, include a head-mounted display configured to be positioned directly in front of the eye of the user. The infrared pixel may be configured to emit infrared light at alternating times relative to visible light emitted from the visible light pixels. The visible light display may include at least one waveguide for directing visible light and infrared light from at least one projector to the eye of the user. At least one of the infrared pixels may be positioned adjacent to and in a same plane as the visible light pixels of the visible light display. At least one of the visible light pixels positioned at a location corresponding to the at least one infrared pixel may be substantially transparent to infrared light, and the at least one infrared pixel may be positioned behind the corresponding at least one visible light pixel to direct infrared light to the eye of the user through the at least one visible light pixel. The at least one infrared pixel may be substantially transparent to visible light and positioned in front of at least one corresponding visible light pixel. The corresponding visible light pixel may be configured to direct visible light to the eye of the user through the at least one infrared pixel.

In some embodiments, the present disclosure includes head-mounted display systems. The head-mounted display systems may include a head-mounted display, an infrared source positioned on or in the head-mounted display, and an infrared sensor. The head-mounted display may be configured to be located centrally in front of a user's eye and for directing visible images to the user's eye when in use. The infrared source may be located centrally in front of the user's eye and may be positioned for directing infrared light to the user's eye. The infrared sensor may be for detecting infrared light from the infrared source and reflected from the user's eye and for tracking a position of the user's eye.

In some examples, the head-mounted display may include an electronic display of an artificial reality system. The infrared source may include at least one of: a plurality of infrared pixels interspersed among visible light pixels of the head-mounted display to produce infrared glints, a plurality of infrared pixels arranged in a predetermined pattern across at least a portion of the head-mounted display, a plurality of infrared pixels positioned in front of corresponding visible light pixels of the head-mounted display, or a plurality of infrared pixels positioned behind corresponding visible light pixels of the head-mounted display. The infrared source may be positioned and configured to direct infrared light to a retina of the user's eye. The infrared sensor may be configured to detect infrared light reflected from the retina of the user's eye. The infrared source may include a modulated light source configured to emit infrared light in a predetermined waveform to facilitate distinction of the infrared light from the infrared source relative to environmental infrared light.

In some embodiments, the present disclosure includes methods for eye tracking. In accordance with such methods, a visible image may be directed to an eye of a user with a plurality of visible light pixels of a visible light display. Infrared light may be directed to the eye of the user with at least one infrared pixel positioned within bounds of the visible light display and between the visible light pixels. Infrared light originating from the at least one infrared pixel and reflected from the eye of the user may be detected with an infrared sensor.

In some examples, directing infrared light originating from the at least one infrared pixel and reflected from the eye of the user may include detecting infrared light reflected from a retina of the eye of the user. A predetermined pattern of infrared light may be directed to the eye of the user with a plurality of infrared pixels.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods that utilize pixels in an HMD display as light sources for eye tracking. As will be explained in greater detail below, embodiments of the instant disclosure may include HMD displays with an array of RGB pixels and some interspersed infrared (IR) pixels. The IR pixels may be arranged in a predetermined pattern, such as a grid, or may be at specific point locations on the HMD display. Locating the IR pixels on the HMD display directly in front of the user may improve eye tracking by more consistently reaching the eye with the IR light. Additionally, the IR light can, in some embodiments, more readily be reflected from the user's retinas for improved eye tracking, as compared with conventional edge-mounted IR sources.

Figure 1:
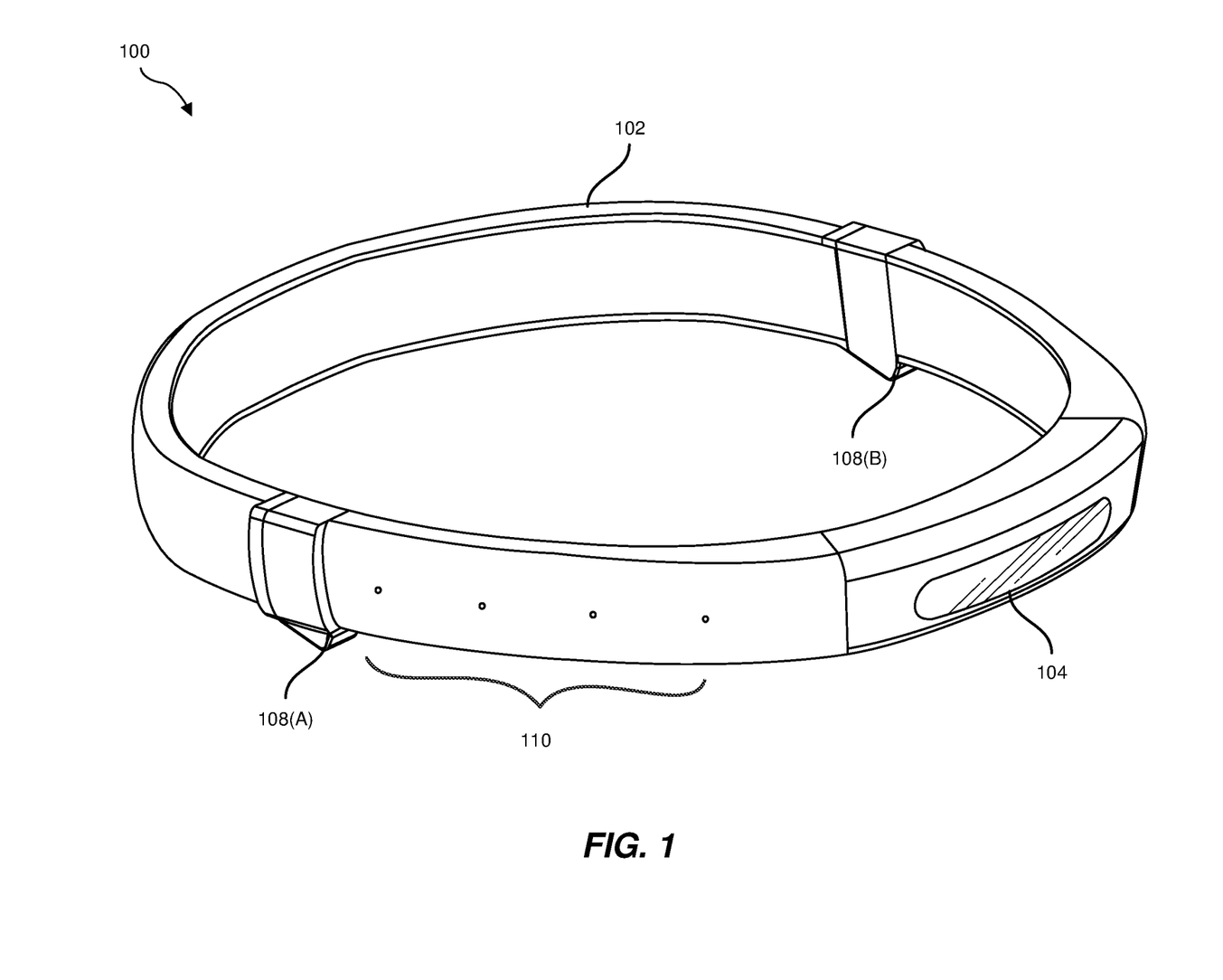
FIGS. 1-3 illustrate perspective views of various artificial reality systems, according to embodiments of the present disclosure.
Figure 2:
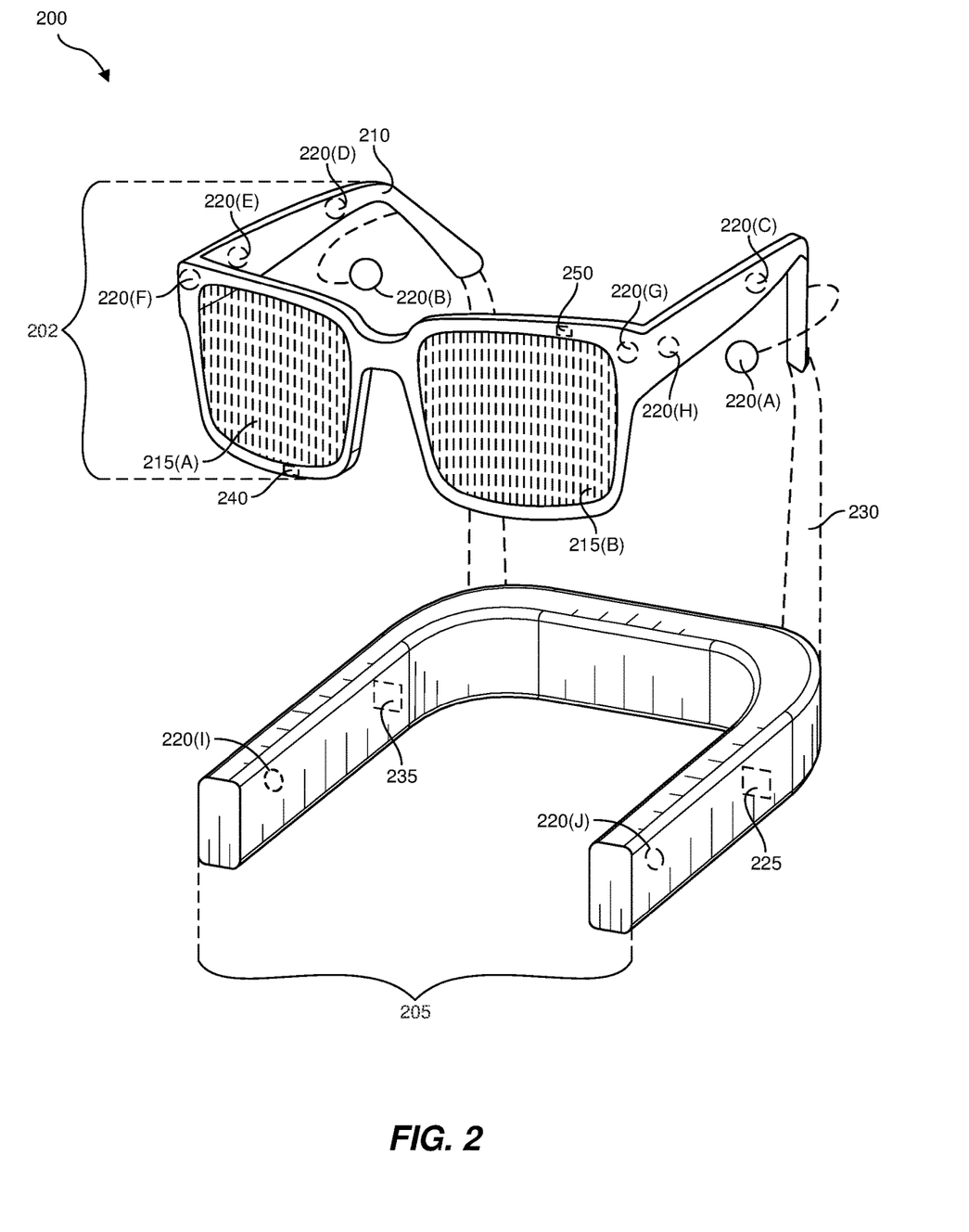
Figure 3:
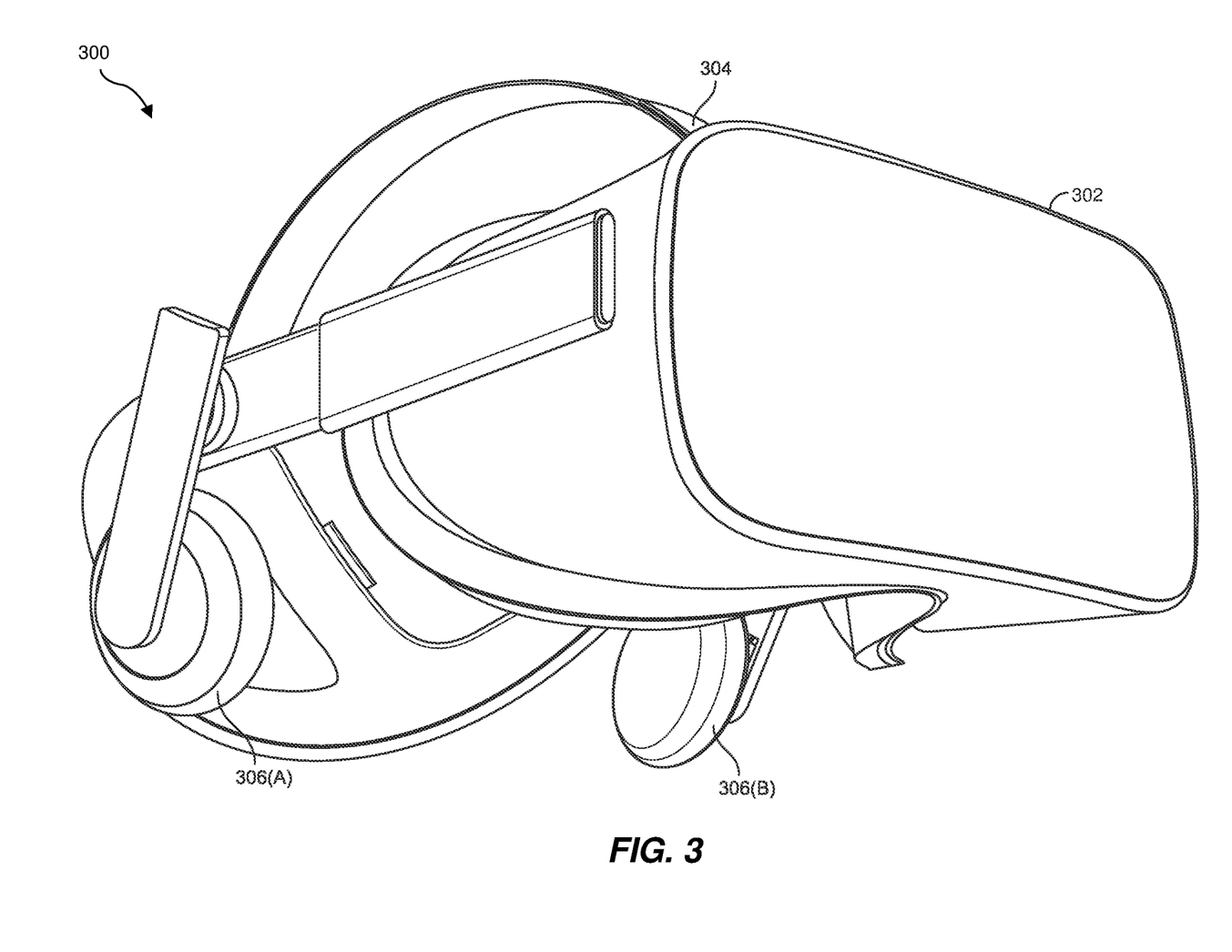

The following will provide, with reference to FIGS. 1-3, detailed descriptions of various artificial reality systems. Detailed descriptions of example display systems with eye-tracking systems are provided with reference to FIGS. 4-8. With reference to FIG. 9, detailed descriptions are provided of an example method for eye tracking.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, the AR system 100 generally represents a wearable device dimensioned to fit about a body part (e.g., a head) of a user. As shown in FIG. 1, the system 100 may include a frame 102 and a camera assembly 104 that is coupled to the frame 102 and configured to gather information about a local environment by observing the local environment. The AR system 100 may also include one or more audio devices, such as output audio transducers 108(A) and 108(B) and input audio transducers 110. The output audio transducers 108(A) and 108(B) may provide audio feedback and/or content to a user, and the input audio transducers 110 may capture audio in a user's environment.

As shown, the AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 100 may not include an NED, the AR system 100 may include other types of screens or visual feedback devices (e.g., a display screen integrated into a side of the frame 102).

The embodiments discussed in this disclosure may also be implemented in AR systems that include one or more NEDs. For example, as shown in FIG. 2, the AR system 200 may include an eyewear device 202 with a frame 210 configured to hold a left display device 215(A) and a right display device 215(B) in front of a user's eyes. The display devices 215(A) and 215(B) may act together or independently to present an image or series of images to a user. While the AR system 200 includes two displays, embodiments of this disclosure may be implemented in AR systems with a single NED or more than two NEDs.

In some embodiments, the AR system 200 may include one or more sensors, such as sensor 240. The sensor 240 may generate measurement signals in response to motion of the AR system 200 and may be located on substantially any portion of the frame 210. The sensor 240 may include a position sensor, an inertial measurement unit (IMU), a depth camera assembly, or any combination thereof. In some embodiments, the AR system 200 may or may not include the sensor 240 or may include more than one sensor. In embodiments in which the sensor 240 includes an IMU, the IMU may generate calibration data based on measurement signals from the sensor 240. Examples of the sensor 240 may include, without limitation, accelerometers, gyroscopes, magnetometers, other suitable types of sensors that detect motion, sensors used for error correction of the IMU, or some combination thereof.

The AR system 200 may also include a microphone array with a plurality of acoustic sensors 220(A)-220(J), referred to collectively as acoustic sensors 220. The acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(I) and 220(J), which may be positioned on a corresponding neckband 205.

The configuration of the acoustic sensors 220 of the microphone array may vary. While the AR system 200 is shown in FIG. 2 as having ten acoustic sensors 220, the quantity of the acoustic sensors 220 may be greater or less than ten. In some embodiments, using higher numbers of the acoustic sensors 220 may increase the amount of audio information collected and/or the sensitivity and accuracy of the audio information. In contrast, using a lower number of the acoustic sensors 220 may decrease the computing power required by the controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

The acoustic sensors 220(A) and 220(B) may be positioned on different parts of the user's ear, such as behind the pinna or within the auricle or fossa of the user's ear. Or, there may be additional acoustic sensors on or surrounding the ear in addition to the acoustic sensors 220 inside the ear canal. Having an acoustic sensor positioned next to an ear canal of a user may enable the microphone array to collect information on how sounds arrive at the ear canal. By positioning at least two of the acoustic sensors 220 on either side of a user's head (e.g., as binaural microphones), the AR device 200 may simulate binaural hearing and capture a three-dimensional ("3D") stereo sound field around about a user's head. In some embodiments, the acoustic sensors 220(A) and 220(B) may be connected to the AR system 200 via a wired connection, and in other embodiments, the acoustic sensors 220(A) and 220(B) may be connected to the AR system 200 via a wireless connection (e.g., a Bluetooth connection). In still other embodiments, the acoustic sensors 220(A) and 220(B) may not be used at all in conjunction with the AR system 200.

The acoustic sensors 220 on the frame 210 may be positioned along the length of the temples, across the bridge, above or below the display devices 215(A) and 215(B), or some combination thereof. The acoustic sensors 220 may be oriented such that the microphone array is able to detect sounds in a wide range of directions surrounding the user wearing the AR system 200. In some embodiments, an optimization process may be performed during manufacturing of the AR system 200 to determine relative positioning of each acoustic sensor 220 in the microphone array.

The AR system 200 may further include or be connected to an external device (e.g., a paired device), such as a neckband 205. As shown, the neckband 205 may be coupled to the eyewear device 202 via one or more connectors 230. The connectors 230 may be wired or wireless connectors and may include electrical and/or non-electrical (e.g., structural) components. In some cases, the eyewear device 202 and the neckband 205 may operate independently without any wired or wireless connection between them. While FIG. 2 illustrates the components of the eyewear device 202 and the neckband 205 in example locations on the eyewear device 202 and the neckband 205, the components may be located elsewhere and/or distributed differently on the eyewear device 202 and/or the neckband 205. In some embodiments, the components of the eyewear device 202 and the neckband 205 may be located on one or more additional peripheral devices paired with the eyewear device 202, the neckband 205, or some combination thereof. Furthermore, the neckband 205 generally represents any type or form of paired device. Thus, the following discussion of the neckband 205 may also apply to various other paired devices, such as smart watches, smart phones, wrist bands, other wearable devices, hand-held controllers, tablet computers, laptop computers, etc.

Pairing external devices, such as the neckband 205, with AR eyewear devices may enable the eyewear devices to achieve the form factor of a pair of glasses while still providing sufficient battery and computation power for expanded capabilities. Some or all of the battery power, computational resources, and/or additional features of the AR system 200 may be provided by a paired device or shared between a paired device and an eyewear device, thus reducing the weight, heat profile, and form factor of the eyewear device overall while still retaining desired functionality. For example, the neckband 205 may allow components that would otherwise be included on an eyewear device to be included in the neckband 205 since users may tolerate a heavier weight load on their shoulders than they would tolerate on their heads, nose, and/or ears. The neckband 205 may also have a larger surface area over which to diffuse and disperse heat to the ambient environment. Thus, the neckband 205 may allow for greater battery and computation capacity than might otherwise have been possible on a standalone eyewear device. Since weight carried in the neckband 205 may be less invasive to a user than weight carried in the eyewear device 202, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

The neckband 205 may be communicatively coupled with the eyewear device 202 and/or to other devices. The other devices may provide certain functions (e.g., tracking, localizing, depth mapping, processing, storage, etc.) to the AR system 200. In the embodiment of FIG. 2, the neckband 205 may include two acoustic sensors (e.g., 220(I) and 220(J)) that may be part of the microphone array (or potentially form their own microphone subarray). The neckband 205 may also include a controller 225 and a power source 235.

Acoustic sensors 220(I) and 220(J) of the neckband 205 may be configured to detect sound and convert the detected sound into an electronic format (analog or digital). In the embodiment of FIG. 2, the acoustic sensors 220(I) and 220(J) may be positioned on the neckband 205, thereby increasing the distance between the neckband acoustic sensors 220(I) and 220(J) and other acoustic sensors 220 positioned on the eyewear device 202. In some cases, increasing the distance between the acoustic sensors 220 of the microphone array may improve the accuracy of beamforming performed via the microphone array. For example, if a sound is detected by the acoustic sensors 220(C) and 220(D) and the distance between the acoustic sensors 220(C) and 220(D) is greater than, e.g., the distance between the acoustic sensors 220(D) and 220(E), the determined source location of the detected sound may be more accurate than if the sound had been detected by the acoustic sensors 220(D) and 220(E) positioned along a temple of the frame 210.

The controller 225 of the neckband 205 may process information generated by the sensors on the neckband 205 and/or the AR system 200. For example, the controller 225 may process information from the microphone array that describes sounds detected by the microphone array. For each detected sound, the controller 225 may perform a direction of arrival ("DoA") estimation to estimate a direction from which the detected sound arrived at the microphone array. As the microphone array detects sounds, the controller 225 may populate an audio data set with the information. In embodiments in which the AR system 200 includes an inertial measurement unit, the controller 225 may compute all inertial and spatial calculations from the IMU located on the eyewear device 202. The connector 230 may convey information between the AR system 200 and the neckband 205 and between the AR system 200 and the controller 225. The information may be in the form of optical data, electrical data, wireless data, or any other transmittable data form. Moving the processing of information generated by the AR system 200 to the neckband 205 may reduce weight and heat in the eyewear device 202, making it more comfortable to the user.

The power source 235 in the neckband 205 may provide power to the eyewear device 202 and/or to the neckband 205. The power source 235 may include, without limitation, lithium ion batteries, lithium-polymer batteries, primary lithium batteries, alkaline batteries, or any other form of power storage. In some cases, the power source 235 may be a wired power source. Including the power source 235 on the neckband 205 instead of on the eyewear device 202 may help better distribute the weight and heat generated by the power source 235.

As noted, some artificial reality systems may, instead of blending an artificial reality with actual reality, substantially replace one or more of a user's sensory perceptions of the real world with a virtual experience. One example of this type of system is a head-worn display system, such as the VR system 300 in FIG. 3, that mostly or completely covers a user's field of view. The VR system 300 may include a front rigid body 302 and a band 304 shaped to fit around a user's head. The VR system 300 may also include output audio transducers 306(A) and 306(B). Furthermore, while not shown in FIG. 3, the front rigid body 302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in the AR system 200 and/or the VR system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in the AR system 200 and/or the VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, the AR system 100, the AR system 200, and/or the VR system 300 may include one or more optical sensors such as two-dimensional ("2D") or 3D cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, the output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 110 may include condenser microphones, dynamic microphones, ribbon microphones, and/or any other type or form of input transducer. In some embodiments, a single transducer may be used for both audio input and audio output.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

In some embodiments, HMD systems of the present disclosure may include eye-tracking systems for detecting the position and/or orientation of a user's eye. The eye-tracking systems may be used to detect or estimate the direction of a user's gaze, such as to predict where the user is looking in a real-world environment (e.g., through a transparent or partially transparent display element) or in a virtual environment (e.g., in an image displayed to the user by an AR system).

Figure 4:
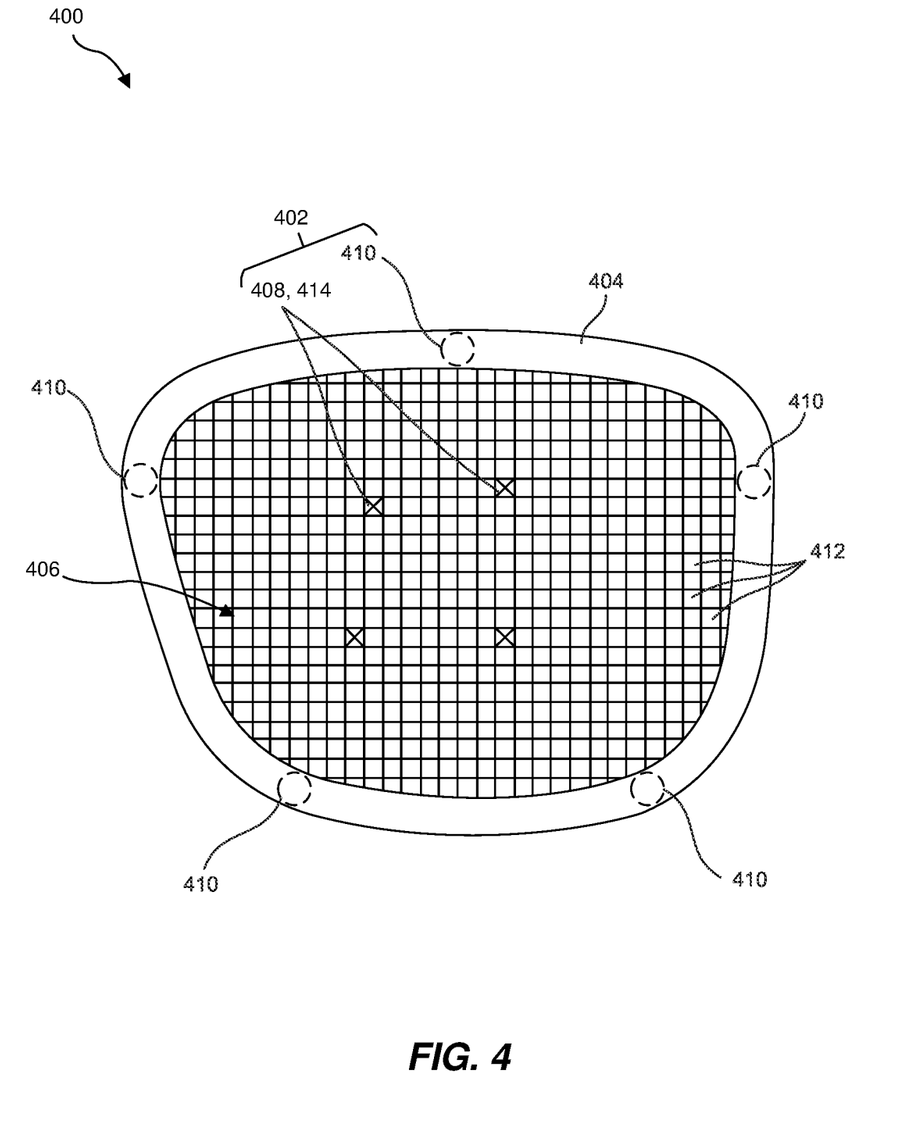
FIG. 4 shows a front view of a display system including an eye-tracking system, according to at least one embodiment of the present disclosure.

For example, FIG. 4 illustrates a front view of a single-eye display system 400 that includes an eye-tracking system 402. The display system 400 may, in some embodiments, be or include a head-mounted display ("HMD") that is configured to be positioned directly in front of the user's eye. The display system 400 may include a frame 404 and a display element 406 (e.g., an HMD) supported by the frame 404. The eye-tracking system 402 may include one or more IR sources 408 for directing IR light to the user's eye and one or more IR sensors 410 (e.g., IR cameras) for detecting IR light originating from the IR source(s) 408 and reflecting from the user's eye.

Although FIG. 4 illustrates a single-eye display system 400 in a head-mounted eyeglass form factor, the present disclosure is not so limited. For example, display systems according to the present disclosure may include two HMD systems (one per eye) or a single HMD system configured for use with two eyes (e.g., a VR display system). In addition, embodiments of the present disclosure may be implemented in a desktop computer screen, a television screen, a laptop computer screen, a mobile device (e.g., cellular phone, tablet computer, gaming device, etc.) screen, a digital watch screen, a projector screen, etc.

The display element 406 may include an array of visible light pixels 412 for displaying a visible image (e.g., a digital image, a digital video) to the user, represented by rectangular boxes in FIG. 4. A size of each of the visible light pixels 412 is exaggerated in FIG. 4 for ease of explanation and improved understanding of configurations of the present disclosure. Each of the visible light pixels 412 may be a so-called "RGB" pixel, which may include red, green, and blue light sources. The intensity of the red, green, and blue light sources within each visible light pixel 412 may be individually controlled and combined for displaying many different colors from each visible light pixel 412.

The display element 406 may display the visible light pixels 412 in a variety of ways. For example, the display element 406 may include a waveguide for directing visible light images originating from a projector supported by the frame 404, a light-emitting diode ("LED") panel, an organic LED ("OLED") panel, a laser display panel, a liquid crystal display ("LCD") panel, etc.

The IR source(s) 408 may emit infrared light via at least one IR pixel 414 positioned within bounds of the display element 406 and between some of the visible light pixels 412, as viewed by the user. For example, the IR source(s) 408 may correspond to multiple IR pixels 414 arranged in a pre-determined pattern across the display element 406. The IR pixels 414 are illustrated as rectangular boxes with an "X" in FIG. 4. A size of each of the IR pixels 414 is exaggerated in FIG. 4 for ease of explanation and improved understanding of configurations of the present disclosure. The IR source(s) 408 may be, for example, a vertical-cavity surface-emitting laser ("VCSEL"), an OLED, an infrared light-emitting diode ("IR LED"), or a quantum dot. In some embodiments, a single pixel may emit both visible light and IR light.

The IR sensor(s) 410 may be positioned on or in the frame 404 and may be directed at an expected position of the user's eye. There are five IR sensors 410 illustrated in the frame 404 around the display element 406 in the example shown in FIG. 4. However, the present disclosure is not limited to embodiments having five IR sensors 410. For example, the eye-tracking system 402 may include a single IR sensor 410, fewer than five IR sensors 410, or more than five IR sensors 410.

The IR pixels 414 may be in predetermined locations in or across the display element 406 to enable the eye-tracking system 402 to determine (e.g., calculate) where the user is looking by detecting (with the IR sensor(s) 410) and analyzing how IR light from the IR pixels 414 reflect from the user's eye. For example, as shown in FIG. 4, the IR pixels 414 may be distinct and separate pixels or groups of pixels for producing a pattern of IR glints. The predetermined pattern may be, as shown in the illustrated example, glints at each corner of a square, with one corner (e.g., the upper left corner, as shown in FIG. 4) offset from the square to form a nonsymmetrical pattern. The nonsymmetrical pattern may enable the eye-tracking system 402 to determine an orientation of a pattern reflected from the eye, such as to determine whether the pattern is reflected from a convex (e.g., cornea) surface or a concave (e.g., retina) surface. In additional examples, the pattern may be symmetrical.

Although four IR sources 408 are illustrated in FIG. 4, the present disclosure is not so limited. For example, additional IR sources 408 may be positioned across substantially an entire area of the display element 406, such as to ensure at least some IR light reaches the user's eye no matter where on the display element 406 the user is gazing. In additional embodiments, fewer (e.g., one to three) IR sources 408 may be positioned within the bounds of the display element 406 (e.g., between the visible light pixels 412). One or more IR sources 408 may also be positioned on or in the frame 404, outside of the bounds of the display element 406, in addition to one or more IR sources 408 within the bounds of the display element 406.

In some examples, the IR pixels 414 may be configured to direct IR light to the user's eye at alternating times relative to visible light emitted from the visible light pixels 412, such as to reduce signal noise relative to pulses of IR light from the IR pixels 414.

The IR pixels 414 may also be configured to emit modulated IR light, such as IR light at predetermined (e.g., different) wavelengths or waveforms. For example, one of the IR pixels 414 may emit light at a first IR wavelength, and another of the IR pixels 414 may emit light at a second, different IR wavelength, to facilitate identification of which IR pixel 414 the IR sensors 410 observe. Alternatively, a single IR pixel 414 may emit a first IR wavelength and may later emit a second, different IR wavelength. In additional examples, the IR light from the IR pixels 414 may have a predetermined waveform (e.g., square waveform, pulsed waveform, etc.), such as to distinguish the IR light emitted by the IR pixels 414 from IR light emitted by environmental sources (e.g., sources of IR light outside of the display system 400). The emission of modulated IR light may enable the IR sensors 410 to more accurately detect which of the IR pixels 414 is detected at any given time.

Additionally, in some embodiments, the IR light emission from the IR pixels 414 may move across the display element 406, such as corresponding to the user's eye movement and/or corresponding to a movement of a visible image displayed by the visible light pixels 412. For example, a plurality of IR pixels 414 may be positioned across the display element 406 and may be selectively activated to produce an IR light pattern that moves relative to the display element 406. In other embodiments, the IR pixels 414 may generate an IR light pattern that remains in a static position relative to the display element 406.

Figure 5:
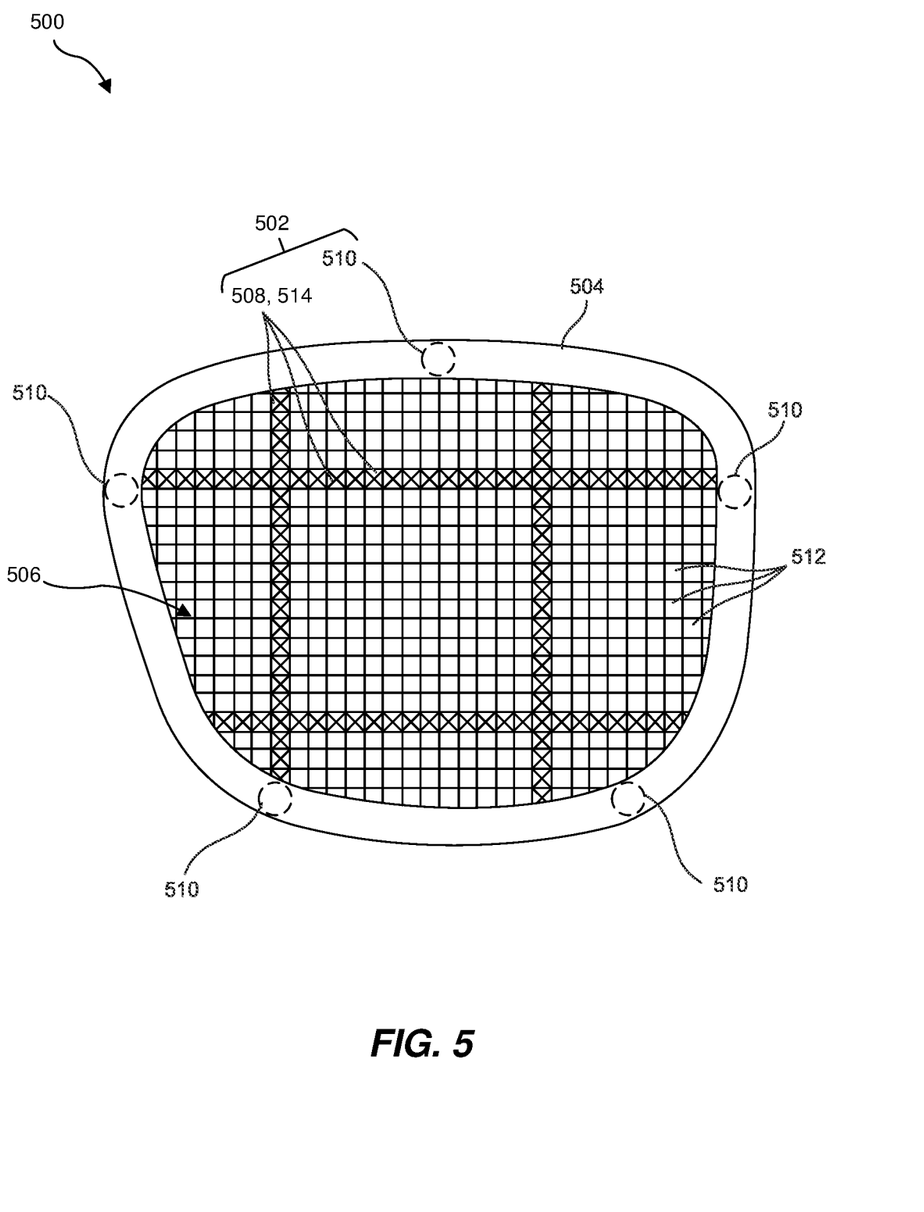
FIG. 5 shows a front view of a display system including an eye-tracking system, according to at least one additional embodiment of the present disclosure.

The IR light can be emitted in a variety of shapes, sizes, patterns, and/or images. FIG. 5 illustrates another example of a display system 500 that can emit IR light in a grid pattern. Like the display system 400 of FIG. 4, the display system 500 of FIG. 5 may include an eye-tracking system 502 and a display element 506 supported by a frame 504. The eye-tracking system 502 may include one or more IR sources 508 to emit IR light from IR pixels 514 and one or more IR sensors 510 positioned in or on the frame 504. The display element 506 may include an array of visible light pixels 512 represented by rectangular boxes in FIG. 5. A size of each of the visible light pixels 512 and of the IR light pattern is exaggerated in FIG. 5 for ease of explanation and improved understanding of configurations of the present disclosure.

The IR pixels 514 may be arranged to direct IR light to a user's eye in a grid pattern, as shown in FIG. 5. The grid pattern may be symmetrical or nonsymmetrical. For example, vertical lines and horizontal lines of IR pixels 514 may extend across the display element 506 to form the grid pattern. The grid pattern may be static relative to the display element 506 or may be movable relative to the display element 506, such as corresponding to a user's eye movement or corresponding to a movement of a visible image displayed by the visible light pixels 512 of the display element 506, as described above. At least some of the IR pixels 514 may be positioned within the bounds of the display element 506, as viewed by the user, and between some of the visible light pixels 512. The IR sensor(s) 510 may be configured to detect IR light originating from the IR pixels 514 and reflected from the user's eye. The reflected pattern may be distorted from the original grid pattern because of the curvature of the user's eye or eye features (e.g., cornea, retina, etc.). The eye-tracking system 502 may be configured to sense the distortions and determine a shape of the user's eye or eye features and/or determine where the user is looking.

Figure 6:
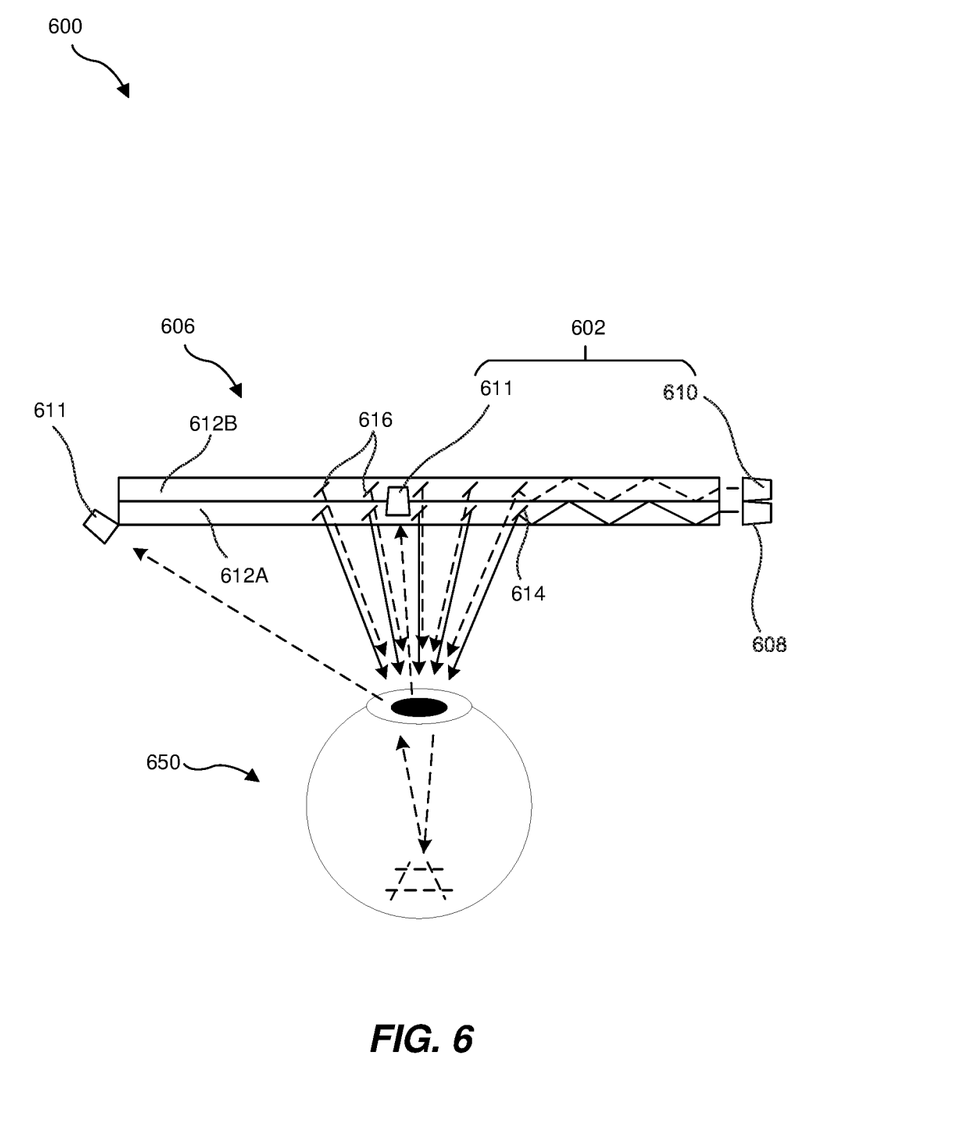
FIGS. 6-8 illustrate top schematic views of various display systems including eye-tracking systems, according to additional embodiments of the present disclosure.
Figure 7:
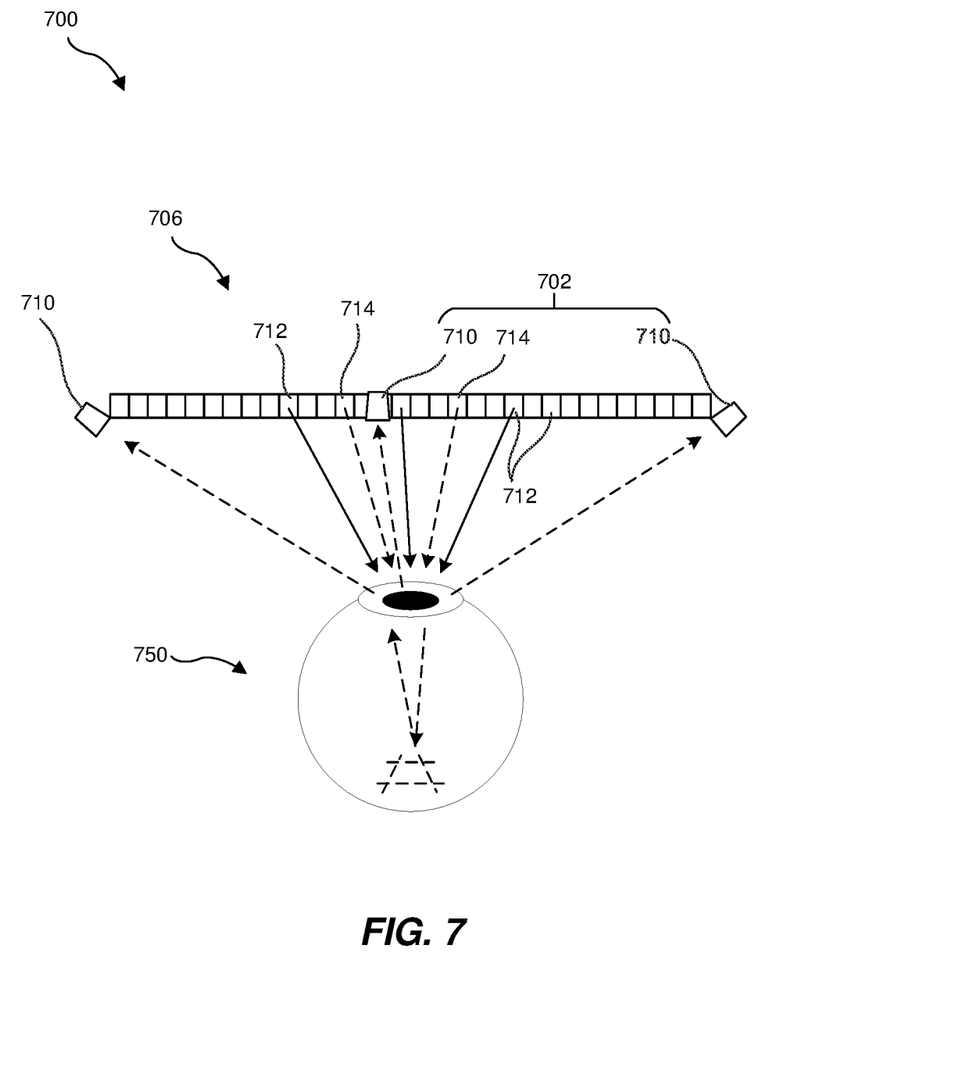
Figure 8:
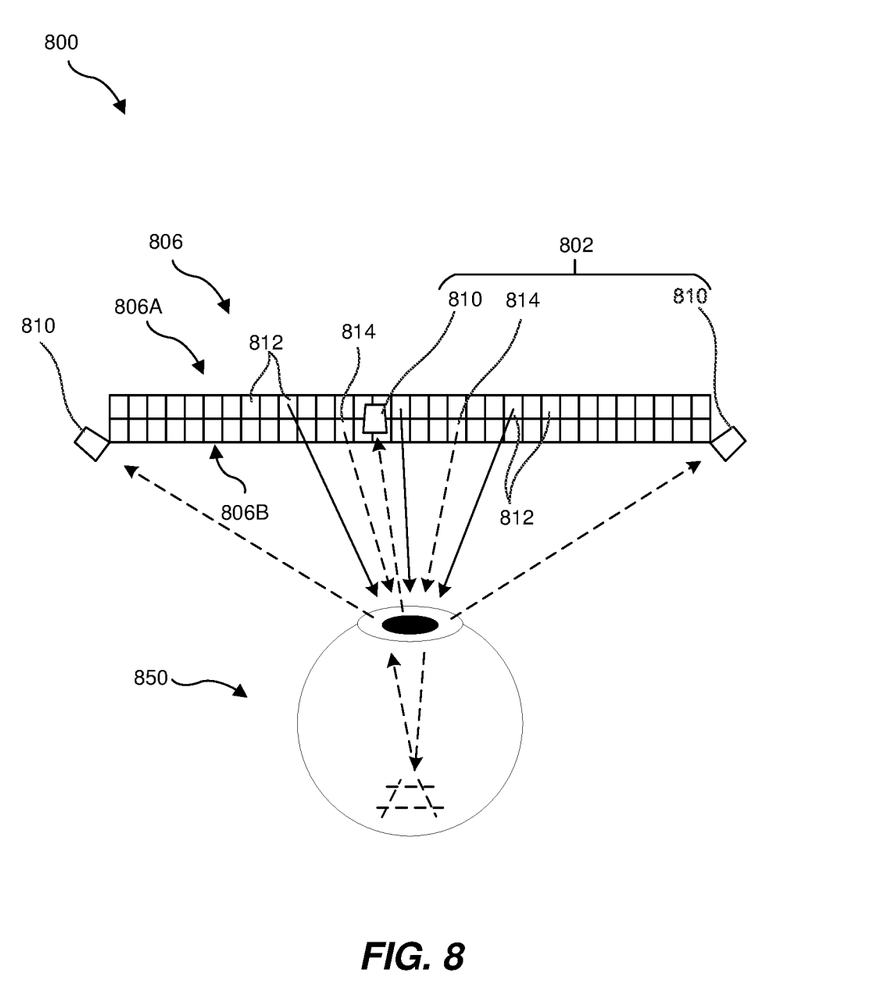
Figure 9:
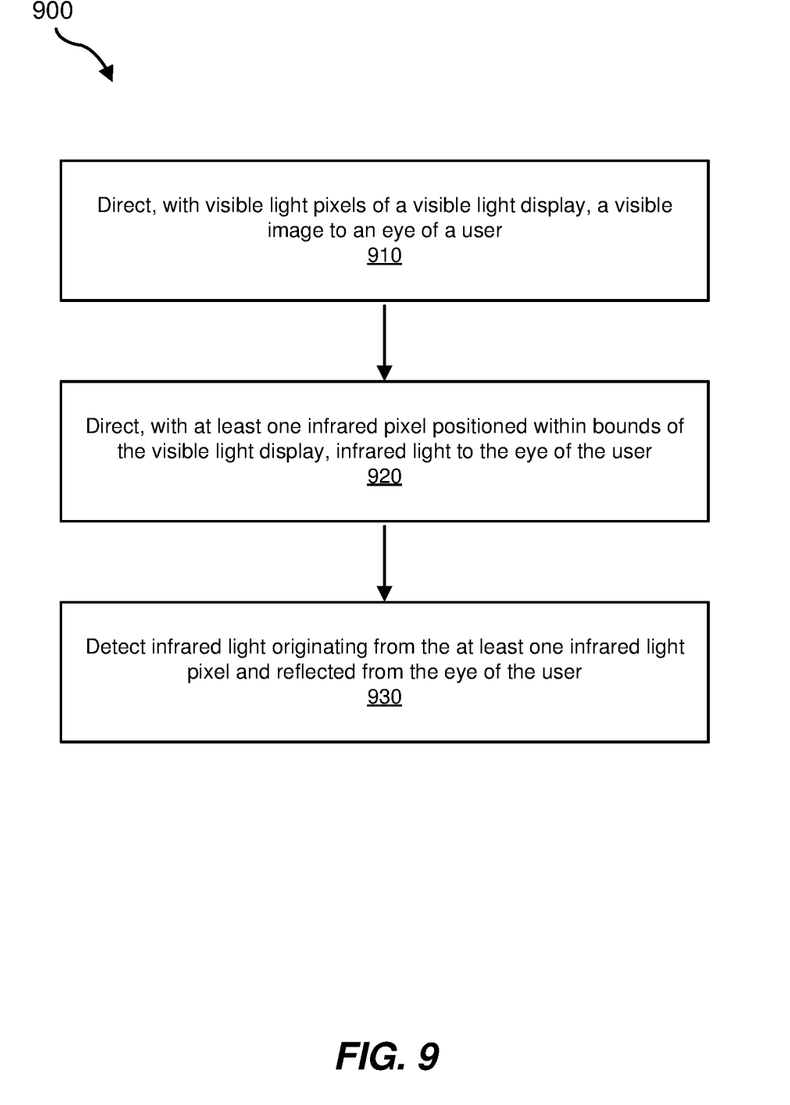
FIG. 9 is a flow diagram illustrating a method for eye tracking, according to at least one embodiment of the present disclosure.

FIGS. 6-8 illustrate different examples of how IR pixels and visible light pixels may be integrated into a display element for tracking the user's eye.

FIG. 6 shows a display system 600 with an eye-tracking system 602 integrated into a projector-and-waveguide display element 606. The display element 606 may include a visible light projector 608 configured to emit visible light, illustrated as solid lines and arrows in FIG. 6. An IR projector 610 may be configured to emit IR light, illustrated as dashed lines and arrows in FIG. 6, and one or more IR sensors 611 may be positioned and configured to detect IR light reflected from a user's eye 650. One or more waveguides 612A, 612B (referred to collectively as "waveguides 612") may be used to direct light from the projectors 608, 610 to the user's eye 650.

As shown in FIG. 6, a visible light (e.g., RGB) waveguide 612A may be configured to direct light from the visible light projector 608 to visible light prism elements 614. The visible light projector 608 may be edge-mounted relative to the visible light waveguide 612A. The visible light prism elements 614 may redirect the visible light toward the user's eye 650. Virtual images may be displayed to the user via the visible light projector 608 and visible light waveguide 612A.

An IR waveguide 612B may be configured to direct light from the IR projector 610 to IR prism elements 616. The IR projector 610 may be edge-mounted relative to the IR waveguide 612B. The IR prism elements 616 may redirect the IR light toward the user's eye 650. IR glints, patterns, or images may be directed to the user's eye 650 via the IR projector 610 and IR waveguide 612B for eye-tracking purposes, for example.

One or both of the waveguides 612 may be transparent to visible light and/or IR light passing through the waveguides 612 to the user's eye 650, such as in an augmented reality system. As illustrated in FIG. 6, the visible light waveguide 612A may be positioned in front of the IR waveguide 612B. In this example, the visible light waveguide 612A may be substantially transparent to IR light (e.g., allowing at least 80% of the IR light to pass) directed from the IR prism elements 616 toward the user's eye 650. Alternatively, the IR waveguide 612B may be positioned in front of the visible light waveguide 612A relative to the user's eye, and the IR waveguide 612B may be substantially transparent to visible light (e.g., allowing at least 80% of the visible light to pass) directed from the visible light prism elements 614 to the user's eye 650. In further examples, one or both of the waveguides 612 may not be substantially transparent to visible light and/or IR light, such as in a virtual reality system.

As shown in FIG. 6, both visible light and IR light originating from the respective projectors 608, 610 may be directed through the waveguides 612 to the user's eye 650. The user may view visible images on the display element 606 originating from the visible light projector 608. The IR light may also originate from within the bounds of the display element 606, as viewed by the user. The IR light may be provided as a pattern of glints (as illustrated in FIG. 4), as a grid pattern (as illustrated in FIG. 5), or as another image or pattern. In some embodiments, IR pixels may overlap corresponding visible light pixels of the display element 606. Alternatively, the prism elements 614, 616 of the respective waveguides 612A, 612B may be arranged to position the IR pixels between visible light pixels without overlapping.

Referring again to FIG. 6, the visible light and IR light may be directed to the user's eye 650. A visible image may be focused on the user's retina, and the user may, therefore, perceive the visible image. Since the IR pixels also emit IR light from within the bounds of the display element 606, at least a portion of an IR pattern may also be focused on the user's retina. FIG. 6 illustrates an IR grid pattern projected on the retina of the user's eye 650. Of course, other IR patterns, images, glints, or portions thereof may alternatively or additionally be projected on the retina.

One or more of the IR sensors 611 may be positioned and configured to detect IR light reflected from the user's retina, cornea, or other features of the user's eye 650. For example, the IR sensor(s) 611 may be positioned on a frame of the display system 600 to detect IR light directly reflecting from features of the user's eye 650. Alternatively or additionally, the IR sensor(s) 611 may be positioned to detect IR light indirectly reflecting from features of the user's eye 650. For example, IR light reflected from the features of the user's eye 650 may pass back through one or both of the waveguides 612 to an IR sensor 611 positioned along an edge of the waveguide(s) 612 and oriented to detect the IR light through the waveguide(s) 612. In examples in which one or more of the IR sensors 611 can detect the IR light pattern (or a portion thereof) reflected from the retina, the eye-tracking system 602 may very accurately determine where a user is looking in the visible image displayed by the display element 606. For example, if a portion of the IR pattern is focused on the retina and detected by the IR sensor(s) 611, a corresponding portion of the visible image where the user is looking will also be focused on the retina. Positioning the IR pixels within the bounds of the display element 606 may enable or facilitate such accurate eye-tracking and gaze estimation by positioning the IR pixels directly in front of the user's eye and coinciding with an image at which the user may be looking.

In addition or alternatively, IR light originating from the IR projector 610 and passing through the IR waveguide 612B may be reflected from the cornea, lens, iris, or sclera of the user's eye 650. This reflected IR light may be detected by one or more of the IR sensors 611 and analyzed to determine or estimate a position and orientation of the user's eye 650 relative to the display element 606.

Although a visible light waveguide 612A and a separate IR waveguide 612B are shown in FIG. 6, embodiments of the present disclosure are not so limited. For example, a single waveguide 612 may be configured to direct both IR light from the IR projector 610 and visible light from the visible light projector 608 toward the user's eye.

FIG. 7 illustrates a display system 700 that includes an eye-tracking system 702 integrated into an electronic display screen 706. The eye-tracking system 702 may include IR pixels 714 and IR sensors 710. The display screen 706 may be, for example, an LCD display screen, an LED display screen, an OLED display screen, a laser display screen, etc. The display screen 706 may include both visible light pixels 712 and at least one of the IR pixels 714 within its bounds, as viewed by the user. In some embodiments, single pixels of the display screen 706 may emit both visible light and IR light.

As shown in FIG. 7, the visible light pixels 712 may be positioned adjacent to, and in a same plane as, the IR pixels 714. In this context, the term "plane" may include a geometrically planar element and/or a curved element, such as a lens, optical reflector, or curved display. The IR light (shown in dashed arrows in FIG. 7) and visible light (shown in solid arrows in FIG. 7) produced by the display screen 706 may be directed to the user's eye 750. The user may perceive a visible image produced by the visible light pixels 712. The IR pixels 714 may direct an IR light pattern or glints to the user's eye 750 for eye-tracking purposes, as explained above. The IR sensors 710 may detect IR light reflected from the user's eye 750 (e.g., from the cornea, iris, lens, retina, and/or sclera of the user's eye 750), as discussed above.

FIG. 8 illustrates a display system 800 that includes an eye-tracking system 802 and a display screen 806, similar to the embodiment described above with reference to FIG. 7. However, the display screen 806 of FIG. 8 may include a visible light display 806A positioned behind a separate IR display 806B, relative to a user's eye 850. The eye-tracking system 802 may include the IR display 806B and the IR sensors 810. The IR display 806B may include an array of IR pixels 814, at least some of which may be positioned within the bounds of the visible light display 806A, as viewed by the user.

The IR display 806B may be substantially transparent to visible light from the visible light display 806A. Thus, visible light emitted from visible light pixels 812 of the visible light display 806A may pass through the IR display 806B toward the user's eye 850. In additional embodiments, the visible light display 806A may be positioned in front of the IR display 806B relative to the user's eye 850. In this case, the visible light display 806A may be substantially transparent to IR light from the IR display 806B, to enable IR light to be directed to the user's eye 850.

As shown in FIG. 8 and as noted above, visible light (illustrated as solid arrows) may be directed from the visible light pixels 812 of the visible light display 806A to the user's eye 850, such as to display a digital image to the user. IR light (illustrated as dashed arrows) may also be directed to the user's eye 850 by the IR pixels 814 of the IR display 806B. As explained above, the IR sensors 810 may detect IR light reflected from the user's eye 850 (e.g., from the cornea, iris, lens, retina, and/or sclera of the user's eye 850) for eye-tracking purposes.

FIG. 9 is a flow diagram illustrating an example method 900 for eye tracking. At operation 910, a visible image may be directed to an eye of a user with a plurality of visible light pixels of a visible light display. Operation 910 may be performed in a variety of ways. For example, any of the displays and display elements capable of emitting visible light and described above with reference to FIGS. 2-8 may be used to direct the visible image to the user's eye.

At operation 920, IR light may be directed to the eye of the user with at least one IR pixel positioned within bounds of the visible light display and between the visible light pixels. Operation 920 may be performed in a variety of ways. For example, any of the IR sources and IR pixels described above with reference to FIG. 4-8 may be used to direct the IR light to the user's eye. The IR light may be directed with a plurality of IR light pixels to the user's eye in a predetermined pattern of IR light, such as a pattern of glints, a grid pattern, or another IR image.

At operation 930, IR light originating from the at least one IR pixel, and reflected from the eye of the user, may be detected with an IR sensor. Operation 930 may be performed in a variety of ways. For example, any of the IR sensors described above with reference to FIGS. 4-8 may be used to detect the reflected IR light. In some examples, the detected IR light may be reflected from a retina, cornea, iris, lens, or sclera of the user's eye. The detected IR light may be analyzed to determine or estimate a position, orientation, and/or gaze of the user's eye.

Accordingly, disclosed are systems and methods that may employ one or more IR pixels interspersed among visible light pixels of an electronic display. Positioning IR pixels in this manner may facilitate and improve eye tracking, including, but not limited to, in head-mounted displays of artificial reality systems. For example, the IR light from the IR pixels may more easily reach the user's eye, past eyelids, eyelashes, and other potential obstructions, since the user will be looking directly at or near the IR pixels when observing a visible image shown on the display.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An eye-tracking system, comprising:
   a visible light display configured to display visible images to an eye of a user via a plurality of visible light pixels;
   a plurality of infrared pixels positioned to project a grid of infrared light invisible to the user from within bounds of the visible light display; and
   an infrared sensor positioned and configured to detect infrared light originating from the plurality of infrared pixels and reflected from the eye of the user.

2. The eye-tracking system of claim 1, wherein the plurality of infrared pixels are positioned laterally between visible light pixels of the visible light display.

3. The eye-tracking system of claim 1, further comprising a frame supporting the visible light display.

4. The eye-tracking system of claim 3, wherein the infrared sensor comprises a plurality of infrared sensor elements positioned on the frame.

5. The eye-tracking system of claim 3, wherein the frame is a frame of an artificial-reality headset.

6. The eye-tracking system of claim 3, further comprising an infrared source positioned on or in the frame.

7. The eye-tracking system of claim 1, wherein each of the visible light pixels comprises at least one visible light source configured to emit red, green, and blue light.

8. The eye-tracking system of claim 1, wherein the infrared pixels are configured to emit infrared light at alternating times relative to visible light emitted from the visible light pixels.

9. The eye-tracking system of claim 1, wherein the visible light display comprises at least one waveguide for directing visible light and infrared light from at least one projector to the eye of the user.

10. The eye-tracking system of claim 1, wherein the plurality of infrared pixels are at least one of:
    interspersed among visible light pixels of the visible light display;
    positioned in front of corresponding visible light pixels of the visible light display; or
    positioned behind corresponding visible light pixels of the visible light display.

11. The eye-tracking system of claim 1, wherein the grid of infrared light comprises a nonsymmetrical grid of infrared light.

12. The eye-tracking system of claim 1, wherein the grid of infrared light is movable relative to the visible light display.

13. A head-mounted display system, comprising:
    a head-mounted display comprising a visible light source including visible light pixels configured to be located centrally in front of a user's eye and for directing visible images to the user's eye when in use;
    an infrared source positioned on or in the head-mounted display to be located centrally in front of the user's eye and for directing to the user's eye a grid of infrared light that is invisible to the user; and
    an infrared sensor for detecting infrared light from the infrared source and reflected from the user's eye and for tracking a position of the user's eye.

14. The head-mounted display system of claim 13, wherein the infrared source comprises a plurality of infrared pixels arranged in a static grid relative to the visible light source.

15. The head-mounted display system of claim 13, wherein the infrared source comprises at least one of:
    a plurality of infrared pixels interspersed among visible light pixels of the head-mounted display;
    a plurality of infrared pixels positioned in front of corresponding visible light pixels of the head-mounted display; or
    a plurality of infrared pixels positioned behind corresponding visible light pixels of the head-mounted display.

16. The head-mounted display system of claim 13, wherein the infrared source is positioned and configured to direct infrared light to a retina of the user's eye, and wherein the infrared sensor is configured to detect infrared light reflected from the retina of the user's eye.

17. The head-mounted display system of claim 13, wherein the infrared source comprises a modulated light source configured to emit infrared light in a predetermined waveform to facilitate distinction of the infrared light from the infrared source relative to environmental infrared light.

18. A method for eye tracking, comprising:
    directing, with a plurality of visible light pixels of a visible light display, a visible image to an eye of a user;
    directing, with infrared pixels positioned within bounds of the visible light display, a grid of infrared light that is invisible to the user to the eye of the user; and
    detecting, with an infrared sensor, infrared light originating from the infrared pixels and reflected from the eye of the user.

19. The method of claim 18, wherein detecting infrared light originating from the infrared pixels and reflected from the eye of the user comprises detecting infrared light reflected from a retina of the eye of the user.

20. The method of claim 18, wherein directing the grid of infrared light comprises selectively activating the infrared pixels to produce an infrared light pattern that moves relative to the visible light display.

\* \* \* \* \*